United States Patent [19]

Hillman

[11] 4,109,146
[45] Aug. 22, 1978

[54] PRESSURE ACTUATED LIGHT PEN

[75] Inventor: Garth Decker Hillman, Ottawa, Canada

[73] Assignee: Northern Telecom Limited, Montreal, Canada

[21] Appl. No.: 790,430

[22] Filed: Apr. 25, 1977

[51] Int. Cl.² .............................................. G02B 5/14
[52] U.S. Cl. .................................... 250/227; 235/472; 350/96.18
[58] Field of Search ................ 235/472, 473; 250/227; 340/146.3 SY; 350/96.18, 255

[56] References Cited

U.S. PATENT DOCUMENTS

| 3,749,932 | 7/1973 | Jones | 350/96.1 X |
|---|---|---|---|
| 3,947,088 | 3/1976 | French | 250/227 X |

Primary Examiner—Lawrence J. Dahl
Attorney, Agent, or Firm—Sidney T. Jelly

[57] ABSTRACT

A pressure actuated light pen attached to the end of an optical fibre bundle has a retractable tip in which is formed an aperture. No image is focussed onto the ends of the fibres until the tip, with the aperture, is retracted to a predetermined position. At this position, the aperture is effectively focussed onto the ends of the fibres, to give an image of sufficient brightness for detection, and processing, by associated circuitry.

6 Claims, 6 Drawing Figures

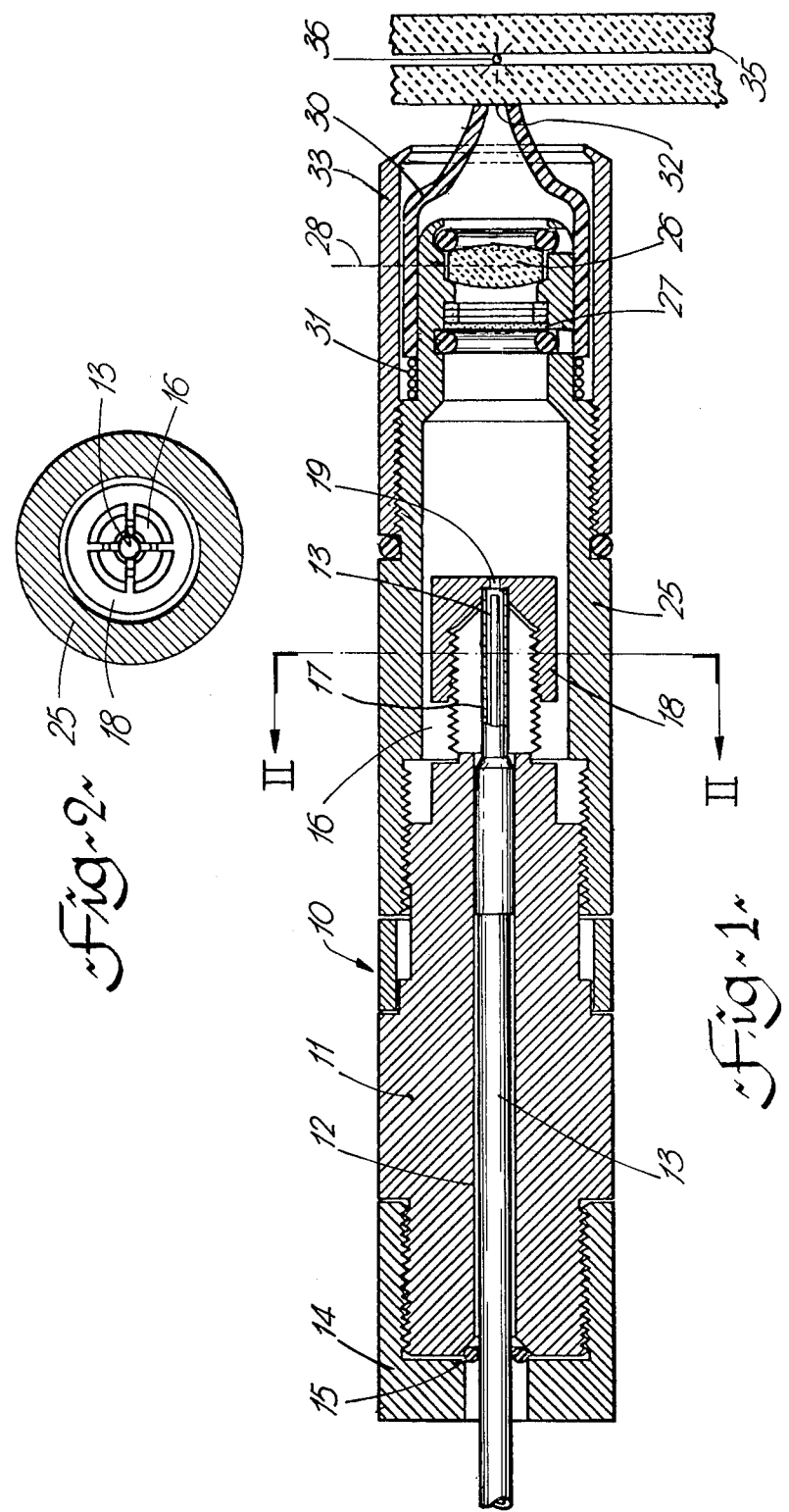

PRESSURE ACTUATED LIGHT PEN

This invention relates to a pressure actuated light pen, such as are used in conjunction with electronic displays for example plasma panels and cathode ray tubes, and to a system associated with the light pen, including a fibre bundle connector and optical receiver and signal processing circuitry.

Light pens are used in association with lighted displays, an electronic light detector being positioned at or adjacent to the "point" or active end of the pen. A pressure actuated switch electrically connects the detector, and any immediately associated electronic circuitry, such as an amplifier, to the signal processing circuitry. The pressure actuation occurs either by the pen contacting the display or by closing of a switch by a finger of the operator. This avoids spurious signals being received by the processing circuit when the pen is not directed at the display. Such devices are subject to electronic "noise" at the display surface and the electrical leads from the pen to the processing circuit also are sensitive to external "noise" sources.

The present invention is concerned with the use of a pen which uses optical fibres to transmit the signal from the pen to a remote detector. To prevent spurious signals, it is arranged that no image is focussed onto the end of the optical fibre bundle until the pen has been pushed down onto the display, in effect moving the "aperture" back to the correct focal length and thus producing a focussed image of the aperture on the fibre bundle end.

The pen comprises a body portion in which is mounted the end of a fibre bundle, a lens system and a retractable tip in which is formed an orifice or aperture. The tip retracts as the pen is pushed against a display and presets the distance from lens to aperture to produce a focussed image on the fibre bundle end, which is then trasmitted, or propagated, along the fibre bundle.

The invention will be readily understood by the following description of a particular embodiment, by way of example, in conjunction with the accompanying drawings, in which:

FIG. 1 is a longitudinal cross-section through one form of light pen in accordance with the present invention;

FIG. 2 is a cross-section on the line II—II of FIG. 1;

Figure 3:
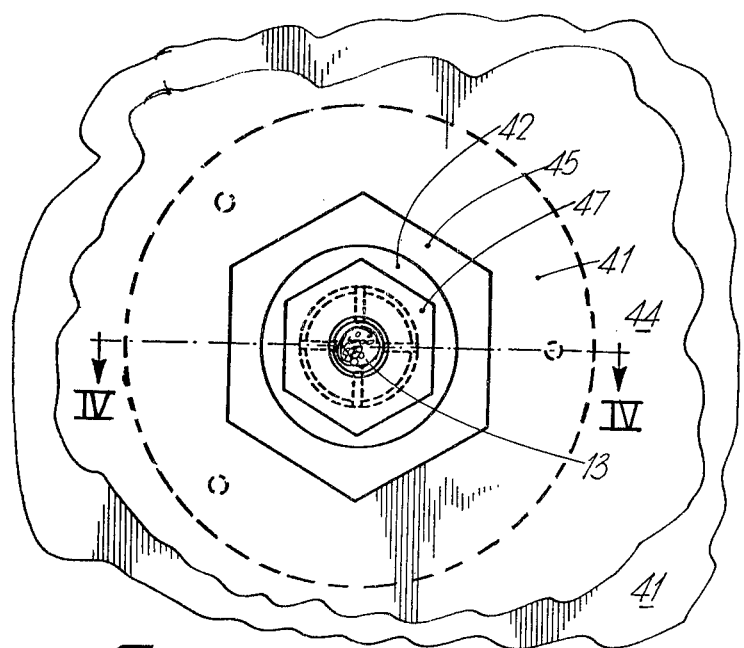
FIG. 3 is a plan view of one form of fibre bundle connector.

FIGS. 1 and 2 illustrate a light pen 10 which is cylindrical in form. The main body portion 11 has an axial bore 12 therethrough for reception of a sheathed optical fibre bundle 13. At the rear end is a cap 14 which screws onto the body portion 11, with a O-ring seal 15. The forward end of the main body portion is formed into a collet chuck 16 which is tightened onto an unsheathed end of the fibre bundle 13 by a threaded nut 18. A metal sleeve 17 encloses the unsheathed end of the fibre bundle and extends over the end of the sheathing. A small orifice 19 is formed in the nut and the end of the fibre bundle is positioned against this orifice.

Onto the outside of the main body portion 11, at the forward end, is screwed a tubular member 25 which holds the lens system 26 and an optical filter 27. A datum line 28 exists for the lens system 26 and the distance from the datum line 28 to the end of the fibre bundle 13 is predetermined, being the image length of the lens system. The filter 27 acts to prevent passage of any light of wavelength other than those to which it is desired the system should be sensitive.

On the forward end of the tubular member 25 is mounted a tubular tip member 30. Tip member 30 is slidable axially on the tubular member 25 and is resiliently urged forward by a light compression spring 31. In FIG. 1, the spring 31 is shown compressed. The forward end of the tip member is tapered to form an orifice or aperture 32. A threaded sleeve 33 screwed onto the tubular member 25 retains the tip member on the forward end of the tubular member.

A portion of a display, in the present example a portion of a plasma panel, is shown at 35 and a light spot indicated at 36. When the light pen 10 is pressed against the panel the tip 30 is retracted until the spring 31 is completely compressed. The dimensions of the tip are such that when the tip is fully retracted, the light spot 36 is a predetermined distance from the lens system 26, such that a focussed image of the light spot 36 is formed on the end of the fibre bundle 13. This condition allows the largest solid angle or cone of light to be detected and the response is maximum.

When the pen is moved away from the panel 35 the light spot becomes unfocussed and the illumination level of the light image on the end of the fibre bundle lowers. Similarly, any light impinging on the aperture 32 from the surrounding ambience, for example room lights, windows and the like will produce a very low level of illumination at the end of the fibre bundle 13.

With the low level of illumination on the end of the fibre bundle, a very low level light signal will be propagated along the fibre bundle to the receiver. In the receiver the fibre bundle is coupled to a detector which produces a signal related to the light signal.

Figure 4:
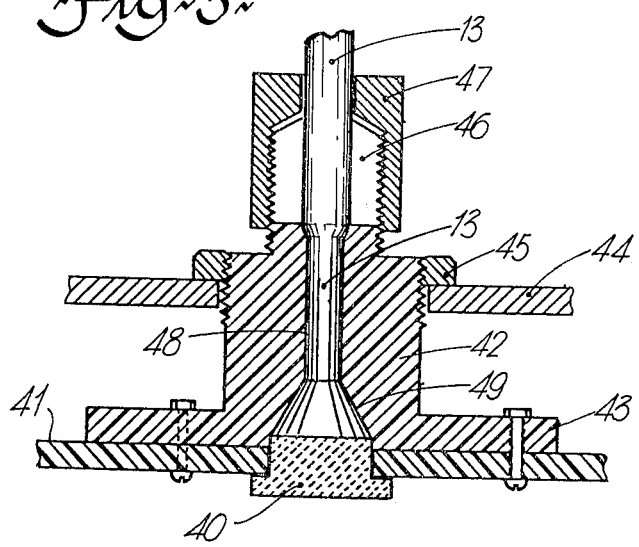
FIG. 4 is a cross-section on the line IV—IV of FIG. 3.

The coupling of the fibre bundle to the optical detector should be capable of repeated disconnect and reconnect while retaining coaxial alignment and separation between fibre bundle and detector. FIGS. 3 and 4 illustrate one form of connector arrangement in which the detector is permanently attached to the printed circuit board and serves to index a connector which is attached to the same printed circuit board.

As illustrated in FIG. 4, the detector 40, for example an avalanche diode, is mounted on printed circuit board 41. The connector has a cylindrical body portion 42 which extends from a rear flange 43. The flange 43 serves to mount the connector on the printed circuit board. In the example illustrated, the body portion 42 extends through a panel 44, a nut 45 being screwed onto the end of the body portion, thereby permitting the separation between the panel 44 and the printed circuit board 41 to be varied. Extending from the body portion 42 is a split collet portion 46 tightened by a nut 47. The collet portion 46 grips the sheathed fibre bundle 13. The end portion of the fibre bundle extends down through an axial bore 48 in the body portion 42 and the end of the bundle is positioned a predetermined short distance from the detector. A divergent bore 49 extends from the position of the end of the fibre bundle to the forward face of the detector 40.

Figure 5:
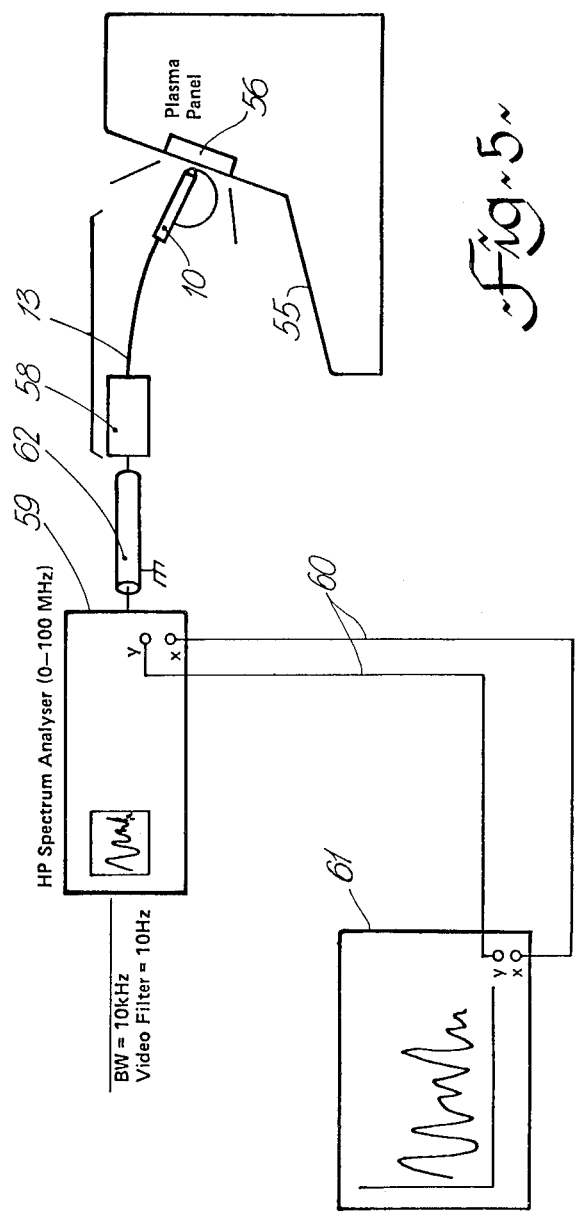
FIG. 5 is a schematic drawing of a system embodying a light pen as in FIGS. 1 and 2.

FIG. 5 illustrates one form of system incorporating the light pen of FIGS. 1 and 2. The light pen 10 is shown in a detecting position relative to a display terminal 55, being positioned adjacent a plasma panel 56. The light pen 10 is connected by the optical fibre bundle 13 via a detector and signal processing circuit indicated at 58, to a spectrum analyser 59 via a 50Ω coaxial cable 62. A typical analyser is a Hewlett-Packard 14IT plug-in spectrum analyser system. From the analyser 59 connections 60 extend to a chart recorder 61. The spectrum analyser 59 and the chart recorder 61 provides a visual indication and a permanent record respectively of signals detected by the detector 58, and fed to the detector from the light pen 10.

Figure 6:
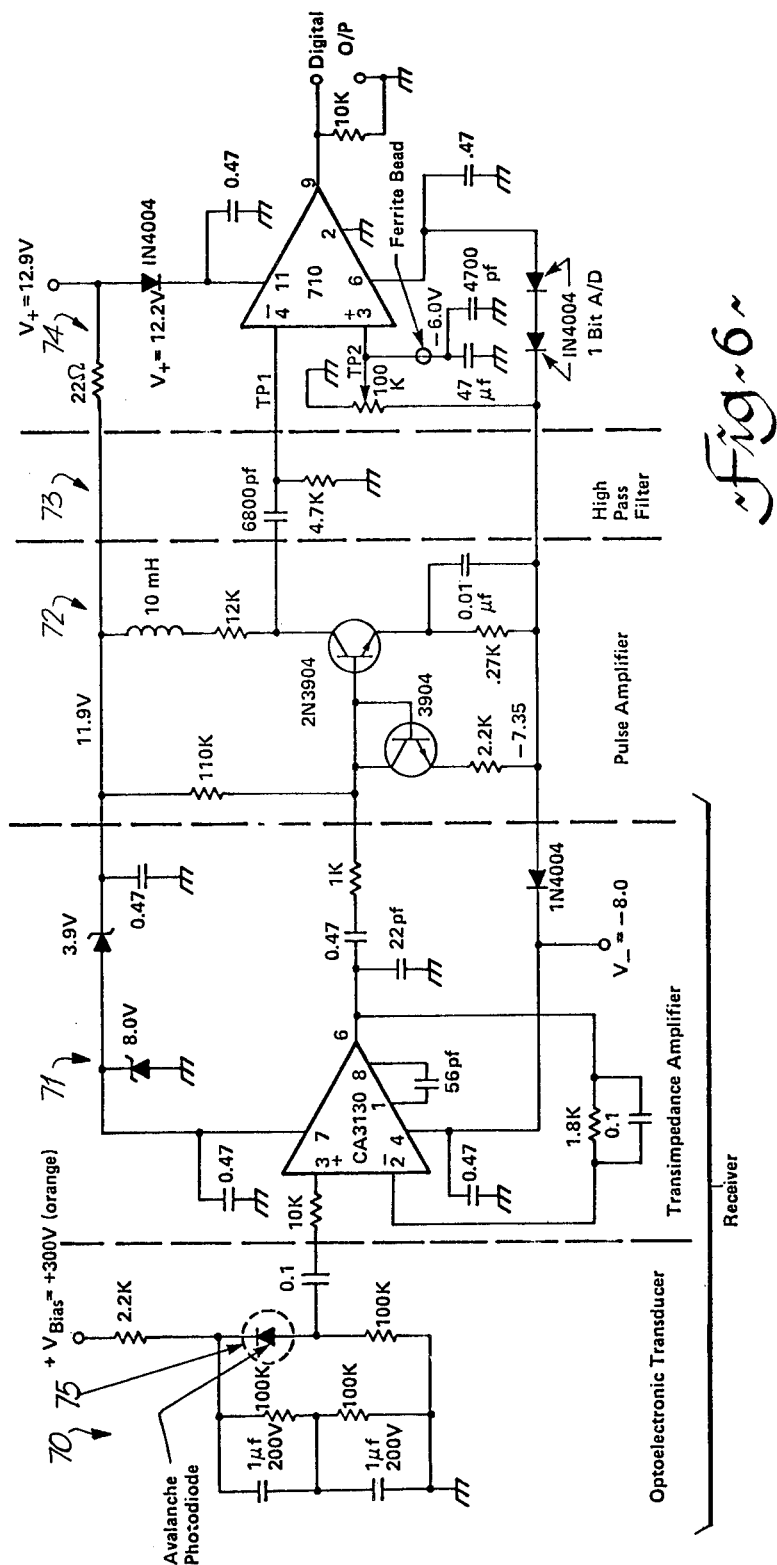
FIG. 6 is a receiver and signal processing circuit.

FIG. 6 is a typical circuit for the signal receiver and processing circuit. The circuit as illustrated in FIG. 6 comprises an optoelectronic transducer 70 and a transimpedance amplifier 71, which together form a receiver. This is followed by a pulse amplifier 72, a high pass filter 73 and an analog-to-digital comparator 74.

The individual circuit sections 70 to 74 are not of themselves novel and are of well known form. Typical values are shown for the individual items for the circuit sections.

The fibre bundle 13, of FIGS. 1 to 4, is connected to the avalanche photodiode 40 in FIG. 4, also indicated as the optoelectronic transducer 70, by the fibre to diode connector illustrated by the dotted circle 75. The optical signal received via the fibre bundle is transformed into an electrical signal in the optoelectronic transducer 70 and passed to the signal processing circuitry via the transimpedance amplifier 71 which buffers the high impedance photodetector circuit of the optoelectronic transducer 70 from the low impendance signal processing circuit 72, 73 and 74. The pulse amplifier 72 amplifies the electrical pulse, from the buffer or transimpedance amplifier 71, having frequency components of not greater than 700 KHz and not less than 50 KHz. The high pass filter 73 provides further attenuation of the frequencies less than 1.33 KHz in the signal output from the pulse amplifier 72. The one bit analog-to-digital circuit 74 is a comparator. The peak of the amplified and filtered electrical signal from the filter 73 is compared with an adjustable threshold. If the peak value exceeds the threshold, a standard 5 volt digital signal is outputted from the comparator. This digital signal is sustained for the duration of time that the peak amplitude exceeds the threshold value. The output from the comparator or analog-to-digital circuit 74 appears at the output terminals 76.

What is claimed is:

1. A pressure actuated light pen comprising:
    a tubular body having front and rear parts;
    means for connecting one end of an optical fibre bundle to said rear part, the end of said bundle at a predetermined position in said body;
    a retractable tubular tip member mounted at said front part and axially slidable from an extended position to a retracted position;
    an aperture at a forward end of said tip member;
    resilient means urging said tip member to said extended position;
    a lens system in said body positioned to image said aperture on the end of said fibre bundle, a light image at said aperture focussed on said end of said fibre bundle when said tip member is retracted to a predetermined position.

2. A light pen as claimed in claim 1, said tubular tip member slidable on said front part of said body, and a tubular retaining member on said body extending over said tip member.

3. A light pen as claimed in claim 1, said lens system at the front end of said body.

4. A light pen as claimed in claim 1, including an optical filter behind said lens system.

5. A light pen as claimed in claim 1, including an optical fibre bundle connected at said one end to said tubular body, and an optical detector connected to the other end of said fibre bundle, for producing a signal indicative of said light image.

6. A light pen as claimed in claim 5, including a signal receiver and processing circuit.

* * * * *